Patented Apr. 7, 1942

2,278,501

UNITED STATES PATENT OFFICE 2,278,501

GLASS COMPOSITION AND PRODUCT THEREOF

Edgar D. Tillyer and Harold R. Moulton, Southbridge, and Townsend M. Gunn, Attleboro, Mass., assignors to American Optical Company, Southbridge, Mass., a voluntary association of Massachusetts No Drawing. Application May 12, 1939, Serial No. 273,362

16 Claims. (Cl. 106—52)

This invention relates to a new glass composition and methods of making said glass and to a lens having the properties of said composition.

This is a continuation in part of our copending application, Serial No. 79,960, filed May 15, 1936, now Patent 2,226,418.

The principal object of this invention is to obtain a substantially colorless composition of matter that is substantially transparent without objectionable absorption in the visible region of the spectrum but which absorbs strongly in the extra visual region, such as the ultra-violet and/or infra-red and which may be controlled as to color, as desired.

Another object of the invention is to provide a lens having the above characteristics.

Another object is to provide a composition or lens having the properties of desirably modifying the resulting colors produced by metallic oxides, such as cobalt, vanadium, chromium, nickel, uranium, iron, etc.

Another object is to provide a composition capable of being made fusible at a temperature much below that of ordinary glass, thereby reducing the attack on refractories, saving on fuel, and permitting the incorporating of ingredients adversely affected by extremely high temperature.

Another object is to obtain a glass of these desirable characteristics which will maintain a practical degree of stability to weathering by atmospheric agents such as water, carbonic acid sulphur acids and the like and to attack by perspiration and other chemical agents to which the glass may be exposed.

Another object is to provide a carrier or solvent of a relatively colorless, brilliant composition which may have a low melting point in which ingredients having other desirable characteristics may or may not be incorporated.

Another object is to control the indices of refraction of materials having the above characteristics so that the resultant glasses may be readily adaptable to ordinary commercial uses; particularly for lens design.

Another object is to provide glass compositions having the above characteristics which will have good optical properties and which may be cast, moulded, annealed, fused and otherwise processed by the usual glass manipulation mechanisms usual in the art.

Another object is to provide a glass composition of the above character containing a relatively large amount of ferrous or ferric oxide, or mixtures of the two, which does not adversely effect the appearance of the finished product.

Another object is the production of infra-red absorbing glass free from undesirable cosmetic effect from the viewpoint of color.

Another object is to provide glasses having the above characteristics which are controlled as to their thermal expansion.

Another object is the production of an infrared absorbing glass of high transmission for visible light, that is, higher than the usual commercial heat absorbing or retarding glasses.

Another object is to provide glass of the above nature having a controlled relatively high reciprocal dispersion.

Another object is to obtain a homogeneous clear glass of the above character which will retain its homogeneity during the melting and subsequent operations.

Another object is to so control the composition of glasses, of this character, that they have resistance to scratching and other abrading action well within the range of ordinary commercial glasses.

Another object is to provide a glass of the above character which is resistant to heat shock.

Another object is to provide a glass composition of the above character which is resistant to solarization, solarization being the term applied to deterioration of ultra-violet transmission by exposure to radiation.

Other objects and advantages of the invention will become apparent from the following description and it will be seen that many changes may be made in the arrangement of parts and methods described without departing from the spirit of the invention as expressed in the accompanying claims. We, therefore, do not wish to be limited to the exact details and methods described as the preferred forms only have been set forth by way of illustration.

In the past, there have been other glass compositions having similar characteristics as regards the retarding of infra-red and/or ultraviolet, but such glasses possessed an undesirable color and relatively low transmitting properties in the visual region and tended to produce an unpleasant cosmetic effect, and to change the color sensations perceived by the eyes. Such prior art glasses were also difficult to melt and to process subsequent to the melting. Several attempts have been made to overcome the above difficulties, from the viewpoint of relatively low transmission properties in the visible region and unpleasant cosmetic effects and change of color sensation as preceived by the eyes, but such glasses were unstable to weathering and difficult to melt and to process subsequent to said melting because of their tendency to crystallize, and separate during melting into a known homogeneous condition and were unstable for further processing.

Although glasses approaching some of these desirable characteristics have been made, no glasses having the characteristics embodying the invention have been obtained and are not, as far as known, commercially available.

The essense of the present invention, therefore, resides in the provision of a composition and/or lens having the desired infra-red and/or ultra-violet retarding properties and which eliminates substantially all of the above mentioned difficulties and which, although possessing desirable ultra-violet and/or infra-red retarding properties, will be substantially colorless.

The invention comprises primarily the forming of a normally colorless vitreous composition having desirable melting and working properties, controlled indices of refraction, controlled reciprocal relative dispersion, controlled coefficient of expansion, high degree of homogeneity and clarity, and which is relatively resistant to scratches and surface abrasions; whose chemical analysis may be expressed as phosphoric anhydride, aluminum oxide or other amphoteric oxides; barius oxide or other alkaline earth oxides, and, if desired, containing alkali oxides with or without the addition of a small quantity of potassium nitrate or other minor ingredients known in the art for assisting the melting process. For example, a composition having desirable characteristics can be formed as follows:

| | Per cent |
|---|---|
| $HPO_3$ | 60 to 80 |
| $Al_2O_3$ | 5 to 20 |
| $BaCO_3$ | 0 to 15 |
| $KNO_3$ | 0 to 1 |

The ingredients $Al_2O_3$ of from 5 to 20% may be replaced in whole or in part by a substantially equivalent quantity of a beryllium compound (BeO).

The resulting compound after melting, upon chemical analysis, would be expressed substantially as follows:

| | Per cent |
|---|---|
| $P_2O_5$ | 52 to 71 |
| $Al_2O_3$ | 5 to 20 |
| BaO | 0 to 12 |
| $K_2O$ | 0 to 10 |

It will be understood that other batch ingredients may be melted together and that the resulting product after melting will have substantially the same composition, by chemical analysis, inasmuch as some products of reaction will escape when melting. The $HPO_3$, above referred to, for example, may be replaced by ammonium phosphate; in which case ammonia is driven off upon heating and the oxide of phosphorous remaining combines with other ingredients. All or part of the phosphorus may be added in the form of phosphates, for example, aluminum phosphate, metaphosphate or the like. In place of barium carbonate, other barium salts may be used; for example, barium hydroxide or peroxide, barium sulphate, barium phosphate and so forth. Another possibility existing is the addition to known reactive dry ingredients, of phosphoric acid either dry or in water solution, in which case the mass will be non-dusting and readily handled and reactions which normally would require a high temperature may take place at a lower temperature previous to the melting operation.

It is also possible to prepare these preliminary compounds by reacting them without added heat. The final reactions and blending of ingredients taking place during the melting operation.

The foregoing composition is in most instances utilized as a carrier for ingredients for absorbing infra-red and/or ultra-violet rays, as well as for other ingredients for altering the color of the finished composition or lens formed therefrom, but may be utilized without said ingredients in instances where a colorless, brilliant glass of desirable indices of refraction, reciprocal relative dispersion, hardness and resistance to corrosion are desired. The glass is highly resistant to attack by hydrofluoric and other strong corrosive acids and it is notable that when such attack takes place the glass retains its sparkling transparency instead of forming the white opaque film which is one of the results of weathering on ordinary silicate glass.

It is to be understood that a composition or product of said composition may comprise the base composition plus any one or more of the infra-red, ultra-violet, plus one or more of the ingredients producing absorption in the ultra-violet or in the infra-red or any combination of these 3, depending upon the nature and characteristics of the lens desired.

To form a lens having infra-red absorptive properties the following bath composition is given as an example:

| | Per cent |
|---|---|
| $HPO_3$ | 81 |
| $Al_2O_3$ | 7.5 |
| $BaCO_3$ | 4.5 |
| $Fe_3(PO_4)_2.8H_2O$ | 0.1–25 |

This glass has all the desirable characteristics of the original composition set forth above plus the added feature of absorbing infra-red radiations. As above described, it is of course clear that these batch ingredients are given only by way of example and that other ingredients which will result in substantially the same end product after melting may be used as set forth above.

To form a composition or product thereof having properties for absorbing ultra-violet rays, the colorless base composition plus about ½ to 8 per cent or more of the weight of the base batch of cerium oxide ($CeO_2$) may be used depending upon the amount of ultra-violet absorption desired. Other ultra-violet absorbing agents may be used; such as vanadium, uranium, manganese, chromium and ferric iron or any combination of the above.

To incorporate in the above composition the properties for absorbing infra-red rays as well as ultra-violet rays, a percentage of 0.1% to 25% of ferrous phosphate ($Fe_3(PO_4)_2.8H_2O$) may be used. It will be understood that other iron compounds may be used, such as ferrous ammonium phosphate and other ferrous salts decomposable by heat, or all other known compounds which will produce the desired results when incorporated in proper proportions.

Ferric salts may be used and reduced during the melting operation by control of the furnace atmosphere or by incorporation of reducing agents; such as carbon, aluminum powder or other desirable means. It is also possible to add the infra-red absorbing ingredients or ingredients in the metallic form.

A composition or product thereof comprising the foregoing properties, that is, infra-red and/or ultra-violet absorption properties, will be substantially colorless when completed. Therefore, to obtain a lens of the desired color, suitable amount of salts of cobalt, gold, didymium, and/or other known color producing ingredients may be used, depending upon the color desired.

It is to be understood that the invention is not limited to the specific use of the color producing ingredients above mentioned, the said ingredients being set forth only by way of illustration.

It will also be understood that one or more of the above mentioned color producing ingredients may be utilized in the composition and that colors other than blue and green may be formed if desired.

The index of refraction of the above glass compositions may be controlled by the introduction of varying amounts of alkali, alkaline-earth or amphoteric oxides. In all cases the percentage of phosphorus pentoxide ($P_2O_5$) as found by chemical analysis, or as calculated by the batch composition, is 50% or above. The other constituents may be varied over a very wide range limited only by the condition just mentioned. For example, phosphorus glasses can be formed with $P_2O_5$ and alkaline oxide. By alkaline oxide we mean oxides of lithium, sodium and/or potassium. We have found that homogeneous and substantially colorless glasses can be obtained with a calculated composition of 70% $P_2O_5$ and 30% of $Na_2O$. Substitution of potassium or lithium for sodium leads to glasses in substantially the same proportions. Such glasses are quickly attacked by moisture in the atmosphere and have no commercial value as glasses. The addition of aluminum, beryllium, manganese, lime, strontium, barium, or some amphoteric elements such as aluminum, scandium, zirconium, etc. in amounts up to 30%, so long as the $P_2O_5$ content remains within the limits previously mentioned, result in clear homogeneous stable glasses with the index of refraction depending upon the particular element added and the amount.

In our case, the preferred additions for a glass which will fit the major requirements in the ophthalmic art, are lime and aluminum because through their use good glasses are obtained with the index of refraction substantially 1.523 which is the standard value in the ophthalmic industry. A sample composition as shown by analysis is as follows:

| | Per cent |
|---|---|
| $P_2O_5$ | 80 |
| $Al_2O_3$ | 15 |
| $Na_2O$ | 2.5 |
| $CaO$ | 2.5 |

Index of refraction approximately 1.523.

It is to be understood, however, that the index may be raised or lowered, as desired, by the use of more or less of said controlling materials. The reciprocal relative dispersion may be controlled by variation of these added ingredients. High aluminum content, for example, favors a high reciprocal relative dispersion. The percentage of this material used can be altered without appreciably affecting the index of refraction. The coefficient of expansion of glasses containing soda and phosphate only is relatively high and would lead to difficulties in the manipulation and use of such glasses. Additions of lime reduce this value and additional amounts of alumina reduce it substantially more to bring it well within the range of the present commercial glasses. This lowering of the thermal expansion aids the heat shock resisting of such glasses and varied amounts of these materials inherently vary the coefficient of expansion. The glasses containing $P_2O_5$, lime and/or alumina, when low in alkali, (for example, below 5%) have a strong tendency to lose their homogeneity during subsequent heating and processing which would be essential in the application of this glass. We have discovered that the presence of alkali in these phosphate glasses produces glasses of extraordinary working range with no tendency to lose its homogeneity, that is, to form devitrification products, either crystalline or amorphous. Addition of alumina is also very helpful in this respect. For example, a phosphate glass consisting of $P_2O_5$—70% and $CaO$—30% devitrifies so easily that difficulty is experienced in annealing or manipulating samples of this glass.

In a glass having the composition of $P_2O_5$—70%, $CaO$—20% and $Na_2O$—10%, where there is a substitution of $Na_2O$—10% for the equivalent amount of $CaO$ does not devitrify even though strenuous attempts are made to produce devitrification. This is given only by way of illustration.

The glasses mentioned are useful for some specific optical glasses but our main interest is in using them as a solvent or carrier for absorbers of ultra-violet infra-red radiations. These absorbing agents are added in amounts which may be controlled so that they do not appreciably affect the working properties, index of refraction or dispersion of the glasses.

As mentioned above, the glasses containing $P_2O_5$ and $Na_2O$ only are very quickly attacked by atmospheric moisture. Glasses containing $P_2O_5$, $CaO$ and $Na_2O$ are somewhat better in this respect but not enough to be practical for general commercial uses. For this purpose it is essential that adequate amounts of beryllium or aluminum or similar amphoteric elements be added. The favorable influence of such addition may be seen from the following data: A glass having the composition as shown by chemical analysis, of $P_2O_5$—70, $Na_2O$—14.4, $CaO$—14.4 dissolved completely in boiling water. A glass having the composition as shown by chemical analysis, of $P_2O_5$—80%, $Na_2O$—2.5%, $CaO$—2.5% and $Al_2O_3$—15% gave a solubility of only 1.6% for the same test. This compares to the value of our standard commercial crown glass which has from 4 to 6% solubility. The last mentioned glass also has excellent working properties and satisfies most of the objects of the invention.

Glasses embodying beryllium and aluminum, etc., such as specified above, are resistant to scratching and other abrading action well within the range of ordinary commercial glasses and lenses may be made from them with the standard grinding and polishing technique of the industry.

It has been found that glasses within the scope of this invention are particularly resistant to deterioration when exposed to ultra-violet radiations. Some of them, for example, were exposed to a type H3 quartz capillary mercury lamp, with the outer bulb removed, for 150 hours at a distance of 5½ inches. This subjects them to intense ultra-violet radiation which normally causes ordinary glass to deteriorate in ultra-violet transmission. Glasses within the scope of this invention are substantially unaffected.

The compositions which have been given are the analysis as calculated from the batch. For batch materials any available source of the desired ultimate oxides may be used. The $P_2O_5$ content is preferably between 70 and 85%, the alkali oxide content is between 0 and 30% and we prefer to use about approximately 10%. The alkaline earth content used may be from 0 to 30% and of the alkaline earths we prefer lime because it affords an excellent means for controlling the index of refraction, thermal expansion and so forth. This is a wide variable range depending upon the amounts of the other constituents which the resultant glass is to have. For the amphoteric elements beryllium and aluminum are favored, particularly aluminum, because of its much lower cost at present. The amount of aluminum, expressed as $Al_2O_3$ which may be present in the glass, can vary from 0 to 20%, larger amounts leading to difficulty in melting. Beryllium has the advantage that, because of its low atomic weight, smaller amounts of it give resistance to corrosion equivalent to those obtained through the use of larger quantities of aluminum. It is also to be understood that mixtures of aluminum and beryllium and mixtures of beryllium, aluminum and other amphoteric elements may be used.

The above produces a substantially colorless stabilized glass having characteristics generally similar to the major commercial silicate glasses now in present use.

Glasses produced by a base batch, such as given above, may be made to absorb the infra-red almost completely by the addition of iron compounds to the batch, for example, with the addition of 2% of iron expressed as FeO the so-called total energy transmission, which is a standard test of the radiation from a 200 watt high intensity Mazda lamp, is cut down from 90.0% to 39.5%. Additional amounts of iron continuously lower this total energy transmission till from 20% of FeO only 4.5% of the total energy from the bulb is transmitted by a specimen of glass 2 mm. thick.

From the above it will be seen that from 0.1 to 20% of iron as FeO may be added. It is to noted that the addition of this iron has no appreciable effect upon the colorless characteristics of the base batch if suitable precautions are taken to keep the glass in a reduced condition, by a reduced furnace atmosphere or if suitable reducing agents, such as carbon, are incorporated in the batch.

To form a composition or product having properties for absorbing ultra-violet rays cerium oxide ($CeO_2$), of from .5 to 5% of the batch, might be used. In cases where it is desired to have an even more complete absorption of the ultra-violet radiation, we have determined that by control of the furnace atmosphere, so as to permit a small part of the iron to be utilized to the ferric condition, the ultra-violet absorption is increased to a point where 5% is transmitted in a 2.0 mm. thick sample to 367 milli microns.

The preferred batch having all of the above desired characteristics is substantially as follows:

| | Per cent |
|---|---|
| $P_2O_5$ | 78 |
| $Na_2O$ | 5 |
| CaO | 5 |
| $Al_2O_3$ | 10 |
| FeO | 2 |

The above ultimate products may be obtained from any suitable raw products.

It is to be understood that the above is given only by way of illustration of a glass having the desired characteristics. It is to be noted that only specified percentages have been given in this latter instance. These percentages may be varied as set forth above within practical limits so that the invention herein is not to be limited to the specific percentages. In some instances, for some particular uses, wider ranges of percentages might be desirable.

It has been constantly mentioned that the resultant glass, even with the infra-red and ultra-violet absorbing agents therein, is substantially colorless, by this it is meant that the glass has substantially the same or better visible transmission than the ophthalmic glass. Substantially colorless, therefore, as set forth above, is intended to mean that the glass does not have an undesirable greenish or bluish tint as are present in most prior art glasses of this nature. We take special precautions to keep silica and boric acid out of the glass because it has been found that even small amounts of these materials introduce an undesirable greenish or bluish tint and may also adversely affect the chemical stability. The addition of small amounts of titanium introduce an undesirable purplish tint and precaution should be taken that it does not exist in the contents of the glass.

It will also be understood that the percentages set forth in the foregoing formulas are only by way of illustration as to the forming of a usable composition or product of said composition, and that the said percentages may be varied within reasonable limits without materially affecting the composition.

It is to be noted that the statements herein to the effect that the glass compositions are free from silicon compounds means that in the finished glass the silicon content must be less than 1 per cent.

From the foregoing description it will be seen that a novel composition of matter and a novel article possessing infra-red and ultra-violet absorption properties, and being substantially colorless, is formed, and that means is provided by which the color of said composition may be controlled and varied as desired.

Having described our invention, we claim:

1. A substantially colorless light transmitting medium having the property of selectively absorbing extra visual radiations, said medium being commercially free from compounds of boron and having the contents of silicon compounds less than 1% and comprising, as a major constituent, an oxide of phosphorus to the extent of at least 50%, with minor quantities of ingredients selected from alkali and alkaline earth groups and stabilized against chemical attack by means of a stabilizer having the stabilizing characteristics of and comprising an aluminum compound and beryllium compound and containing compounds for absorbing extra visual radiations.

2. A substantially colorless light transmitting medium having the property of selectively absorbing infra-red radiations, said medium being commercially free from compounds of boron and having the contents of silicon compounds less than 1% and comprising, as a major constituent, an oxide of phosphorus, to the extent of at least 50% with minor quantities of ingredients selected from alkali and alkaline earth groups and stabilized against chemical attack by means of a stabilizing agent having the stabilizing characteristics of and comprising an aluminum compound and beryllium compound and containing a compound of iron in the ferrous condition for infra-red radiation absorption.

3. A substantially colorless light transmitting medium having the property of selectively absorbing ultra-violet radiations, said medium being commercially free from compounds of boron and having the contents of silicon compounds less than 1% and comprising, as a major constituent, an oxide of phosphorus to the extent of at least 50% with minor quantities of ingredients selected from alkali and alkaline earth groups and stabilized against chemical attack by means of a stabilizing agent having the stabilizing characteristics of and comprising an aluminum compound and beryllium compound and containing an ingredient having the ultra-violet absorbing characteristics of cerium.

4. A substantially colorless light transmitting medium having the property of selectively absorbing extra visual radiations, said medium being commercially free from compounds of boron and having the contents of silicon compounds less than 1% and comprising as a major constituent an oxide of phosphorus to the extent of at least 50%, with minor quantities of ingredients selected from alkali and alkaline earth groups and stabilized against chemical attack by means of a stabilizing agent having the stabilizing characteristics of and comprising an aluminum compound and beryllium compound and containing a compound of iron in the ferrous condition for infra-red radiation absorption and an ingredient having the ultra-violet absorbing characteristics of cerium.

5. A substantially colorless light transmitting medium having the property of selectively absorbing infra-red radiations, said medium being commercially free from compounds of boron and having the contents of silicon compounds less than 1% and comprising, as a major constituent, an oxide of phosphorus, to the extent of at least 50% with minor quantities of ingredients selected from alkali and alkaline earth groups and stabilized against chemical attack by means of a stabilizing agent having the stabilizing characteristics of and comprising an aluminum compound of approximately 8 to 12% of the total batch of the medium and containing a compound of iron in the ferrous condition for infra-red radition absorption.

6. A substantially colorless light transmitting medium having the property of selectively absorbing infra-red radiations, said medium being commercially free from compounds of boron and having the contents of silicon compounds less than 1% and comprising, as a major constituent, an oxide of phosphorus, to the extent of at least 50% with minor quantities of ingredients selected from alkali and alkaline earth groups and stabilized against chemical attack by means of a stabilizing agent having the stabilizing characteristics of and comprising a beryllium compound and containing a compound of iron in the ferrous condition for infra-red radiation absorption.

7. A substantially colorless light transmitting medium whose chemical analysis may be expressed substantially as: $P_2O_5$—approximately 73%; $Na_2O$—approximately 10%; $CaO$—approximately 5%; $Al_2O_3$—approximately 8%, and $FeO$—approximately 4%.

8. A substantially colorless light transmitting medium whose chemical analysis may be expressed substantially as: $P_2O_5$—50 to 90%; alkali group oxide—approximately 2.5 to 20%; alkaline earth group oxide—approximately 2.5 to 14%; $BeO$—approximately 1 to 12%, and $FeO$ approximately 4%.

9. A substantially colorless light transmitting medium whose chemical analysis may be expressed substantially as: $P_2O_5$—50 to 90%; alkali group oxide—approximately 2.5 to 20%; alkaline earth group oxide—approximately 2.5 to 14%; $Al_2O_3$ and $BeO$—approximately 1 to 12%, and $FeO$ approximately 4%.

10. A substantially colorless light transmitting medium whose chemical analysis may be expressed substantially as: $P_2O_5$—50 to 95%; alkali group oxide—approximately 1.5 to 20%; alkaline earth group oxide—approximately 1.5 to 13%; $BeO$— approximately 1 to 12% and containing 1 to 5% of an ingredient having the ultra-violet absorbing characteristics of cerium.

11. A substantially colorless light transmitting medium whose chemical analysis may be expressed substantially as: $P_2O_5$ of an amount in excess of 50% according to the remainder of the batch; alkali group oxide—approximately 2 to 20%; alkaline earth group oxide—approximately .5 to 13%; $Al_2O_3$ and $BEO$—approximately 1 to 12% and containing 1 to 5% of an ingredient having the ultra-violet absorbing characteristics of cerium.

12. A substantially colorless light transmitting medium, said medium being commercially free from compounds of boron and having the content of silicon compounds less than 1% and comprising as a major constituent, an oxide of phosphorus to the extent of at least 50%, with minor quantities of ingredients selected from alkali and alkaline earth groups and stabilized against chemical attack by means of a stabilizer having the stabilizing characteristics of and comprising aluminum compound.

13. A substantially colorless light transmitting medium, said medium being commercially free from compounds of boron and having the content of silicon compounds less than 1% and comprising as a major constituent, an oxide of phosphorus to the extent of at least 50%, with minor quantities of ingredients selected from alkali and alkaline earth groups and stabilized against chemical attack by means of a stabilizer having the stabilizing characteristics of and comprising beryllium compound.

14. A substantially colorless light transmitting medium, said medium being commercially free from compounds of boron and having the content of silicon compounds less than 1% and comprising as a major constituent, an oxide of phosphorus to the extent of at least 50%, with minor quantities of ingredients selected from alkali and alkaline earth groups and stabilized against chemical attack by means of a stabilizer having the stabilizing characteristics of and comprising an aluminum compound and a beryllium compound.

15. A substantially colorless light transmitting medium having a controlled index of refraction and reciprocal relative dispersion, said medium having a chemical analysis which may be expressed substantially as $P_2O_5$—50 to 95%; alkali group oxide—approximately 2 to 19%, alkaline earth group oxides—approximately 2 to 19% and BeO—approximately 1 to 12%.

16. A substantially colorless light transmitting medium having a controlled index of refraction and reciprocal relative dispersion, said medium having a chemical analysis which may be expressed substantially as $P_2O_5$—50 to 95%; alkali group oxide—approximately 2 to 19%, alkaline earth group oxides—approximately 2 to 19% and $Al_2O_3$ and BeO—approximately 1 to 12%.

EDGAR D. TILLYER.
HAROLD R. MOULTON.
TOWNSEND M. GUNN.